United States Patent
Viken Valvåg et al.

(10) Patent No.: US 10,402,403 B2
(45) Date of Patent: Sep. 3, 2019

(54) UTILIZATION OF PROBABILISTIC CHARACTERISTICS FOR REDUCTION OF GRAPH DATABASE TRAVERSALS

(71) Applicant: Microsoft Technology Licensing, LLC, Redmond, WA (US)

(72) Inventors: Steffen Viken Valvåg, Tromsø (NO); Amund Kronen Johansen, Tromsø (NO); Dag Steinnes Eidesen, Tromsø (NO); Åge Kvalnes, Tromsø (NO); Tor Kreutzer, Tromsø (NO); Jan-Ove Almli Karlberg, Tromsø (NO); Peter Dahle Heen, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 234 days.

(21) Appl. No.: 15/399,975

(22) Filed: Jan. 6, 2017

(65) Prior Publication Data
US 2018/0173760 A1   Jun. 21, 2018

Related U.S. Application Data

(60) Provisional application No. 62/435,069, filed on Dec. 15, 2016.

(51) Int. Cl.
*G06F 16/2453*   (2019.01)
*G06F 16/901*   (2019.01)
(Continued)

(52) U.S. Cl.
CPC .... *G06F 16/24542* (2019.01); *G06F 16/9024* (2019.01); *G06N 5/003* (2013.01); *G06N 5/022* (2013.01)

(58) Field of Classification Search
CPC ......... G06F 17/30463; G06F 17/30958; G06F 16/24542; G06F 16/9024; G06N 7/005; G06N 5/003; G06N 5/022
See application file for complete search history.

(56) References Cited

U.S. PATENT DOCUMENTS 6,397,206 B1 * 5/2002 Hill .................. G06F 16/24542
                                                           707/713
6,427,234 B1    7/2002 Chambers et al.
(Continued)

FOREIGN PATENT DOCUMENTS

EP    3016004 A1   5/2016
WO   2011151500 A1  12/2011

OTHER PUBLICATIONS

Niu Yin, "Introduction to Probabilistic Data Structures", https://dzone.com/articles/introduction-probabilistic-0, Published on: Apr. 30, 2015, 1-26 pages.
(Continued)

*Primary Examiner* — Alexander Khong
*Assistant Examiner* — Hubert Cheung
(74) *Attorney, Agent, or Firm* — Merchant & Gould

(57) ABSTRACT

Traversing data stored in a relational graph by utilization of probabilistic characteristics associated with the graph nodes is disclosed. When a user submits a request with a graph query, an initial node associated with the graph query is identified. Further, the edge type associated the node is extracted from the graph query. When traversing the graph by following relevant edges from the initial node to new nodes, each new node is queried with the extracted edge type. If the query for the node is negative, then the edges for the particular node are not enumerated. However, if the query for the node is positive, then the edges for the particular node are enumerated for expanding the subgraph. This process continues until the subgraph is expanded to
(Continued)

include all relevant nodes. Thus, the computational efficiency is improved by reducing the number of edges that must be traversed when performing graph queries.

18 Claims, 7 Drawing Sheets

(51) Int. Cl.
*G06N 5/00* (2006.01)
*G06N 5/02* (2006.01)

(56) References Cited

U.S. PATENT DOCUMENTS

| | | | |
|---|---|---|---|
| 6,556,983 B1 | 4/2003 | Altschuler et al. | |
| 7,363,299 B2* | 4/2008 | Dalvi | G06F 17/30542 |
| 7,424,498 B1 | 9/2008 | Patterson | |
| 7,899,861 B2 | 3/2011 | Feblowitz et al. | |
| 8,086,598 B1 | 12/2011 | Lamb et al. | |
| 8,156,129 B2* | 4/2012 | Zhou | G06F 17/30958 |
| | | | 707/721 |
| 8,321,430 B2 | 11/2012 | Zvi et al. | |
| 8,326,847 B2 | 12/2012 | Balmin et al. | |
| 8,423,538 B1* | 4/2013 | Sadikov | G06F 17/30463 |
| | | | 707/722 |
| 8,819,078 B2 | 8/2014 | Roy et al. | |
| 9,071,533 B2 | 6/2015 | Hui et al. | |
| 9,092,481 B2* | 7/2015 | Digana | G06F 17/30958 |
| 9,141,727 B2* | 9/2015 | Arikuma | G06F 17/30014 |
| 9,158,847 B1 | 10/2015 | Majumdar | |
| 9,244,983 B2 | 1/2016 | Yang et al. | |
| 9,348,880 B1 | 5/2016 | Kramer et al. | |
| 9,367,880 B2 | 6/2016 | Raina et al. | |
| 9,378,241 B1 | 6/2016 | Shankar et al. | |
| 9,626,407 B2* | 4/2017 | Behal | G06F 17/30424 |
| 2005/0175245 A1 | 8/2005 | Sutanto et al. | |
| 2006/0064432 A1 | 3/2006 | Pettovello | |
| 2007/0174309 A1 | 7/2007 | Pettovello | |
| 2007/0282470 A1 | 12/2007 | Hernandez et al. | |
| 2008/0243770 A1 | 10/2008 | Aasman | |
| 2008/0294615 A1 | 11/2008 | Furuya et al. | |
| 2009/0300002 A1 | 12/2009 | Thomas et al. | |
| 2010/0036835 A1 | 2/2010 | Stergiou et al. | |
| 2010/0211924 A1* | 8/2010 | Begel | G06F 8/74 |
| | | | 717/101 |
| 2010/0268722 A1 | 10/2010 | Yalamanchi et al. | |
| 2011/0246439 A1 | 10/2011 | Isard et al. | |
| 2011/0295841 A1 | 12/2011 | Sityon et al. | |
| 2011/0296517 A1 | 12/2011 | Grigoriev et al. | |
| 2012/0047114 A1 | 2/2012 | Duan et al. | |
| 2012/0047149 A1 | 2/2012 | Zhou et al. | |
| 2012/0158636 A1* | 6/2012 | Bowers | G06N 7/005 |
| | | | 706/50 |
| 2012/0303627 A1 | 11/2012 | Keeton et al. | |
| 2013/0110876 A1 | 5/2013 | Meijer et al. | |
| 2013/0179467 A1 | 7/2013 | Ain | |
| 2013/0204903 A1 | 8/2013 | Hao et al. | |
| 2013/0232452 A1 | 9/2013 | Krajec et al. | |
| 2013/0246454 A1 | 9/2013 | Menten | |
| 2013/0275410 A1 | 10/2013 | Atedgi et al. | |
| 2014/0067781 A1 | 3/2014 | Wolchok et al. | |
| 2014/0067791 A1 | 3/2014 | Idicula et al. | |
| 2014/0068533 A1 | 3/2014 | Goswami et al. | |
| 2014/0136520 A1 | 5/2014 | Digana | |
| 2014/0136553 A1 | 5/2014 | Jacob et al. | |
| 2014/0164347 A1 | 6/2014 | Jeh et al. | |
| 2014/0172914 A1 | 6/2014 | Elnikety et al. | |
| 2014/0250047 A1 | 9/2014 | Bounouane et al. | |
| 2014/0278590 A1 | 9/2014 | Abbassi et al. | |
| 2014/0324864 A1 | 10/2014 | Choe et al. | |
| 2014/0330818 A1* | 11/2014 | Raina | G06Q 30/02 |
| | | | 707/723 |
| 2014/0337317 A1 | 11/2014 | Woss et al. | |
| 2014/0365503 A1 | 12/2014 | Franceschini et al. | |
| 2015/0081741 A1 | 3/2015 | Xu | |
| 2015/0106324 A1* | 4/2015 | Puri | G06N 5/04 |
| | | | 706/52 |
| 2015/0169758 A1 | 6/2015 | Assom et al. | |
| 2015/0193636 A1 | 7/2015 | Snelling | |
| 2015/0220530 A1 | 8/2015 | Banadaki et al. | |
| 2015/0234936 A1* | 8/2015 | Hu | G06N 5/02 |
| | | | 707/798 |
| 2015/0242402 A1 | 8/2015 | Holm et al. | |
| 2015/0248487 A1* | 9/2015 | Baranowski | H04L 41/12 |
| | | | 707/609 |
| 2015/0310129 A1* | 10/2015 | Ushijima | G06F 17/30557 |
| | | | 707/798 |
| 2015/0317360 A1 | 11/2015 | Ngai et al. | |
| 2015/0324410 A1 | 11/2015 | Glover | |
| 2015/0363461 A1 | 12/2015 | Behal et al. | |
| 2015/0363705 A1 | 12/2015 | Moore et al. | |
| 2015/0370919 A1* | 12/2015 | Bornhoevd | G06F 17/30958 |
| | | | 707/798 |
| 2016/0034462 A1 | 2/2016 | Brewer | |
| 2016/0055311 A1 | 2/2016 | Buchanan et al. | |
| 2016/0063017 A1 | 3/2016 | Bartlett et al. | |
| 2016/0092350 A1 | 3/2016 | Rajanna et al. | |
| 2016/0110134 A1 | 4/2016 | Rao et al. | |
| 2016/0117358 A1 | 4/2016 | Schmid et al. | |
| 2016/0148093 A1* | 5/2016 | Adderly | G06N 5/022 |
| | | | 706/46 |
| 2016/0189218 A1 | 6/2016 | Kota | |
| 2016/0203327 A1 | 7/2016 | Akkiraju et al. | |
| 2017/0206276 A1 | 7/2017 | Gill | |
| 2017/0364539 A1 | 12/2017 | Jacob et al. | |
| 2018/0039696 A1 | 2/2018 | Zhai et al. | |
| 2018/0053327 A1 | 2/2018 | Contractor et al. | |
| 2018/0096035 A1 | 4/2018 | Kreutzer et al. | |
| 2018/0113950 A1* | 4/2018 | Blanchflower | G06F 17/30958 |
| 2018/0121482 A1 | 5/2018 | Heen et al. | |
| 2018/0173727 A1 | 6/2018 | Kreutzer et al. | |
| 2018/0247073 A1 | 8/2018 | Kreutzer et al. | |
| 2019/0171840 A1 | 6/2019 | Kreutzer et al. | |

OTHER PUBLICATIONS

Fan, et al., "Cuckoo Filter", https://github.com/efficient/cuckoofilter, Published on: Jan. 15, 2016, 2 pages.

Hintsanen, et al., "Finding reliable subgraphs from large probabilistic graphs", in Journal of Data Mining and Knowledge Discovery, Aug. 2008, 3 pages.

"Getting Started with IBM Graph", Retrieved From: https://ibm-graph-docs.ng.bluemix.net/gettingstarted.html, Retrieved Date: Aug. 9, 2016, 9 Pages.

"Quotient Filter", Retrieved From: https://en.wikipedia.org/w/index.php?title=Quotient_filter&oldid=720907087, May 18, 2016, 6 Pages.

"Non Final Office Action Issued in U.S. Appl. No. 15/282,718", dated Oct. 9, 2018, 16 Pages.

Cheng, et al., "Fast Graph Query Processing with a Low-Cost Index", in the Very Large Data Bases Journal, vol. 20, Issue 4, Aug. 2011, pp. 521-539.

Fard, et al., "Effective Caching Techniques for Accelerating Pattern Matching Queries", in Proceedings of the IEEE International Conference on Big Data, Oct. 27, 2014, pp. 491-499.

Gai, et al., "An Efficient Summary Graph Driven Method for RDF Query Processing", Retrieved From: https://arxiv.org/pdf/1510.07749.pdf, Oct. 17, 2016, 12 Pages.

Gomes-Jr, et al., "Beta-Algebra: Towards a Relational Algebra for Graph Analysis", in Proceedings of the Workshops of the EDBT/ICDT 2015 Joint Conference, Mar. 27, 2015, pp. 157-162.

Gomes-Jr, et al., "Querying and Managing Complex Data", in Proceedings of the 18th East European Conference on Advances in Databases and Information Systems and Associated Satellite Events, Sep. 7, 2014, pp. 317-321.

Gomes-Jr, et al., "Towards Query Model Integration: Topology-Aware, IR-Inspired Metrics for Declarative Graph Querying", in Proceedings of the Joint 2013 EDBT/ICDT Conferences, Mar. 22, 2013, pp. 185-194.

(56) References Cited

OTHER PUBLICATIONS

Hassan, et al., "Graph Indexing for Shortest-Path Finding over Dynamic Sub-Graphs", in Proceedings of the International Conference on Management of Data, Jun. 26, 2016, pp. 1183-1197.

Hunger, Michael, "Querying Graphs with Neo4j", Retrieved From: https://dzone.com/refcardz/querying-graphs-neo4j, Nov. 6, 2015, 26 Pages.

Jindal, et al., "GRAPHiQL: A Graph Intuitive Query Language for Relational Databases", in Proceedings of IEEE International Conference on Big Data, Oct. 27, 2014, pp. 441-450.

Kim, et al., "Retrieving Keyworded Subgraphs with Graph Ranking Score", in Journal of Expert Systems with Applications, vol. 39, Issue 5, Apr. 2012, pp. 4647-4656.

Liptchinsky, et al., "Expressive Languages for Selecting Groups from Graph-Structured Data", in Proceedings of the 22nd International World Wide Web Conference, May 13, 2013, pp. 761-770.

Papailiou, et al., "Graph-Aware, Workload-Adaptive SPARQL Query Caching", in the Proceedings of the ACM SIGMOD International Conference on Management of Data, May 31, 2015, pp. 1777-1792.

"International Search Report and Written Opinion Issued in PCT Application No. PCT/US2017/053856", dated Nov. 23, 2017, 12 Pages.

"International Search Report and Written Opinion Issued in PCT Application No. PCT/US2017/057775", dated Jan. 23, 2018, 13 Pages.

"International Search Report and Written Opinion Issued in PCT Application No. PCT/US2017/065214", dated Feb. 8, 2018, 12 Pages.

"International Search Report and Written Opinion Issued in PCT Application No. PCT/US2018/019072", dated Jul. 10, 2018, 22 Pages.

Rest, et al., "PGQL: A Property Graph Query Language", in Proceedings of the Fourth International Workshop on Graph Data Management Experience and Systems, Jun. 24, 2016, 6 Pages.

Shao, et al., "Trinity", Retrieved From: https://www.microsoft.com/en-us/research/project/trinity/, Oct. 30, 2010, 6 Pages.

Wood, Peter T., "Query Languages for Graph Databases", in Journal of SIGMOD Record, vol. 41, Issue 1, Mar. 2012, pp. 50-60.

Zervakis, et al., "Towards Publish/Subscribe Functionality on Graphs", in Proceedings of the Workshops of the EDBT/ICDT Joint Conference, Mar. 15, 2016, 4 Pages.

"Non Final Office Action Issued in U.S. Appl. No. 15/399,989", dated Jan. 8, 2019, 19 Pages.

"Final Office Action Issued in U.S. Appl. No. 15/282,718", dated Mar. 11, 2019, 13 Pages.

"Non Final Office Action Issued in U.S. Appl. No. 15/338,290", dated May 30, 2019, 13 Pages.

"Notice of Allowance Issued in U.S. Appl. No. 15/399,989", dated Jun. 12, 2019, 12 Pages.

"Notice of Allowance Issued in U.S. Appl. No. 15/282,718", dated Jun. 25, 2019, 8 Pages.

\* cited by examiner

UTILIZATION OF PROBABILISTIC CHARACTERISTICS FOR REDUCTION OF GRAPH DATABASE TRAVERSALS

RELATED APPLICATION

This application claims benefit of U.S. Provisional Patent Application No. 62/435,069 titled "UTILIZATION OF PROBABILISTIC CHARACTERISTICS FOR REDUCTION OF GRAPH DATABASE TRAVERSALS" filed on Dec. 15, 2016, the entirety of which is hereby incorporated by reference.

BACKGROUND

In a graph database, entities are presented as nodes and relationships between those entities are presented as edges in a view of the relational graph maintained by the graph database. The relational graph may be periodically queried by users via graph queries to learn about the relationships between entities. For example, a user may issue a graph query to find friends or contacts within a social network, the documents that a given user has interacted with, the users that a given document has been accessed by, the entities that satisfy various search criteria, etc. Further, it is not uncommon for a graph query to start at a node, then follow a set of edges to a new set of nodes, and expanding along a new set of edges to yet another set of nodes. In dense graphs traversing all edges of nodes in order to match constraints on these edges may be prohibitively expensive.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and computer readable devices embodying instructions are provided herein for reducing latencies and/or improving computational efficiency when traversing data stored in a relational graph by utilization of probabilistic characteristics associated with the graph nodes. When a user submits a request with a graph query, an initial node associated with the graph query is identified. Further, the edge type associated the node is extracted from the graph query. When traversing the graph by following relevant edges from the initial node to new nodes, each new node is queried with the extracted edge type. If the query for the node is negative, then the edges for the particular node are not enumerated. However, if the query for the node is positive, then the edges for the particular node are enumerated for expanding the subgraph. This process continues until the subgraph is expanded to include all relevant nodes.

Accordingly, the utilization of probabilistic characteristics for reduction of graph database traversals provides improvements to the computational efficiency and performance of querying relational graphs, reduces the query execution cost required to traverse the edges within relational graphs, and thereby improves the functionality of the computing devices hosting the relational graphs and running the queries.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
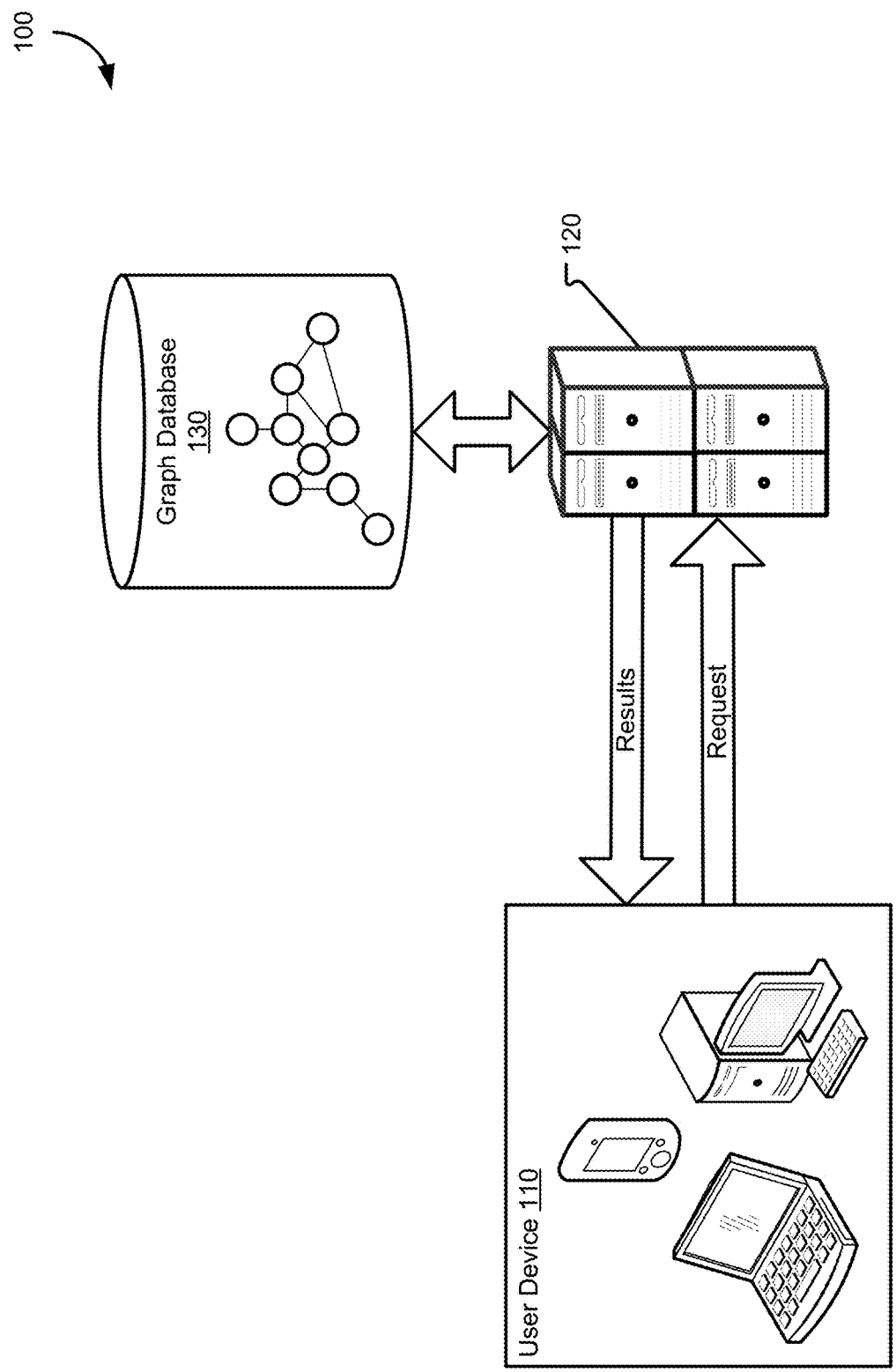
FIG. 1 illustrates an example environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Systems, methods, and computer readable devices embodying instructions are provided herein for reducing latencies and/or improving computational efficiency when traversing data stored in a relational graph by utilization of probabilistic characteristics associated with the graph nodes. When a user submits a request with a graph query, an initial node associated with the graph query is identified. Further, the edge type associated the node is extracted from the graph query. When traversing the graph by following relevant edges from the initial node to new nodes, each new node is queried with the extracted edge type. If the query for the node is negative, then the edges for the particular node are not enumerated. However, if the query for the node is positive, then the edges for the particular node are enumerated for expanding the subgraph. This process continues until the subgraph is expanded to include all relevant nodes.

Accordingly, the utilization of probabilistic characteristics for reduction of graph database traversals provides improvements to the computational efficiency and performance of querying relational graphs, reduces the query execution cost required to traverse the edges within relational graphs, and thereby improves the functionality of the computing devices hosting the relational graphs and running the queries.

FIG. 1 illustrates an example environment 100 in which the present disclosure may be practiced. A user device 110 is in communication with a graph server 120, which maintains a relational graph in a graph database 130. A relational graph maintains several entities as nodes and the relationships between those nodes as edges connecting related nodes. Further, each of the nodes includes a probabilistic characteristic that identifies information regarding the edges extending from the node. In response to receiving a graph query, the edge type is extracted from the query and each node is queried with the edge type. Thus, the system is able to efficiently determine whether to use computation resources for evaluating the edges of a connected node. The results of the request are then transmitted back to the user device 110.

The user device 110 and graph server 120 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 4, 5A and 5B and 6. User devices 110 are operated by users, who may be humans or automated systems (e.g., "bots"). In various aspects, the user device 110, and graph server 120 may be accessed by a user or each other locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

The graph server 120 hosts a graph database 130 of a relational graph with nodes describing entities and a set of accompanying properties of those entities, such as, for example, the names, titles, ages, addresses, etc. Each property can be considered a key/value pair—a name of the properties and its value. In other examples, entities represented as nodes that include documents, meetings, communication, etc., as well as edges representing relations among these entities, such as an edge between a person node and a document node representing that person's authorship, modification, or view of the document.

The graph server 120 executes graph queries that are submitted by various users. The graph server 120 is also operable to access the graph structure description, which resides in the graph database 130, which may include, in various aspects: a relational database, a NoSQL database, or any other database.

Figure 2:
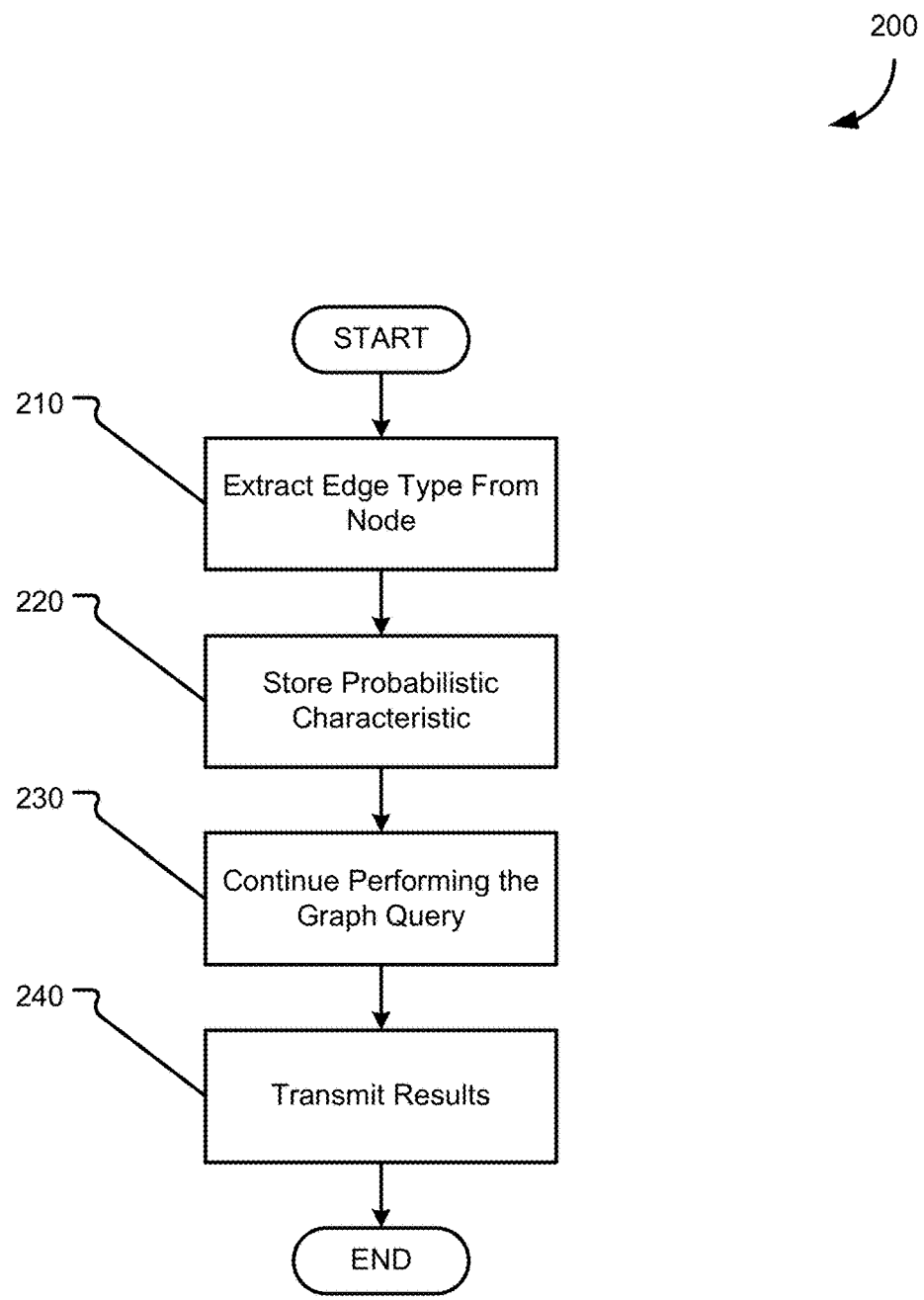
FIG. 2 is a flow chart showing general stages involved in an example method for producing probabilistic characteristics operable to reduce graph traversals for handling graph queries.

FIG. 2 is a flow chart showing general stages involved in an example method 200 for producing probabilistic characteristics operable to reduce graph traversals for handling graph queries. As will be appreciated, a graph query spans a relational graph, jumping from node to node in the relational graph, according to various edges between nodes, and a graph query may specify one or more edge types, edge properties, and/or strengths by which to span the relational graph. Although examples are given herein primarily in terms of edge types, it will be appreciated that other edge properties/strengths may also be used in concert with the present disclosure.

Method 200 begins at OPERATION 210, where an edge type is extracted from a node. For example, several nodes representing persons or other entities in a relational graph may be linked by one or more relationships, such as, for example, "friend_of", "manager_of", "member_of". In various aspects, edge types are extracted from nodes in response to a graph query, or are pre-extracted in anticipation of graph queries, which may be done at the time of node creation or in response to a relationship change for a given node.

To illustrate relationship spanning, consider the entities of "Alice", "Bob", and "Charlie", which are each associated with nodes in a relational graph. If Bob is noted as friends with both Alice and Charlie, and Alice is not a friend of Charlie, a graph query using an edge type of "friend_of" may still traverse the nodes of "Alice" to "Charlie" via the node for "Bob". In a converse illustration, if Alice is noted as the manager of Bob, but no manager relationship exists for Charlie to either Alice or Bob, a graph query using an edge type of "manager_of" would not traverse the relational graph from Alice or Bob to Charlie despite any other edge types existing between the example entities.

In various aspects, the edge types are extracted from the node according to a graph query for the given edge type; if one or more nodes having the given relationship are detected in response to the graph query, the given edge type is extracted. Combination edge types may be extracted in some aspects, such that a responsive node must have more than one edge type to the starting node, while in other aspects, a strength value for the edge type may limit which nodes are considered responsive to the graph query used to extract edge types.

Each node in the relational graph may include a myriad of edges to other nodes, of which only a small portion may be responsive to a given graph query. For example, the node representing Alice may include "friend_of" edges to hundreds of persons, but the graph query includes an edge type of "member_of" to discover what organizations Alice belongs to; the "friend" nodes are not of interest. To avoid examining each edge from each node (to thereby conserve computational resources), the edge types that each node has are in-lined in the node's record via a probabilistic characteristic.

The probabilistic characteristics of a node are stored at OPERATION 220. In various aspects, the probabilistic characteristics are stored in an Approximate Member Query (AMQ) filter, such as a Bloom filter, a cuckoo filter, or a quotient filter. AMQ filters provide a probabilistic check for whether an element is a member of a set that provides no false negatives; for a given comparison the filter returns results of "potentially in the set" or "not in the set". The set that is stored in an AMQ filter includes the edge types that exist for a given node. When a result of "not in the set" is returned, it is determined that the given node does not include an edge of the requested edge type for the graph query. When a result of "potentially in the set" is returned, the node may be examined to determine whether to further traverse the relational graph from the given node.

To store the edge types extracted in OPERATION 210, the AMQ filter provides an array of bits in which hashes of its member set are stored. Various hashing algorithms may be used to record a node's edge types in an AMQ filter. A hashing algorithm (also referred to as a "hash function")

yields a one-way encryption of data (referred to as a hash), which may be achieved according to various algorithms known to those of ordinary skill in the art (SHA-2, SHA256, MD5, BLAKE2, Keccak, GOST, etc.). In various aspects, the AMQ filters are Bloom filters, cuckoo filters, quotient filters, or another probabilistic filter, which provides the graph server 120 a structure to test whether edge type for a given node is a candidate member of a set.

The identifier of the edge type (e.g., a string of that edge type) is hashed by one or more hash functions (or initializations of the same hash function) to determine a position in the array (e.g., the bits at $position_a$ for $hash_1$, $position_b$ for $hash_2$, and $position_c$ for $hash_3$). The bit at the designated position in the array is then set to one/TRUE to record the edge type as a member of the set monitored by the AMQ filter for the given node. The array of the AMQ filter is initially set so that all of its bits are set to zero/FALSE, and as edge types are added to the member set, the bits designated by the hash functions are set to one/TRUE. If a hash function designates a position in the array for which the bit is already set to one/TRUE, that bit will remain set to one/TRUE, which provides 100% recall for the AMQ filter. As the edges for a given node may change over time, with new edges being added, and old edges being removed, in some aspects the AMQ filter is set as a cuckoo filter, which allows for members of the tracked set to be dynamically added and removed while maintaining low computational overhead and a high degree of compression that is stored in-line with the nodes.

The AMQ filter includes k hash functions (e.g., one hashing algorithm initialized with k keys) and a membership array of m bits. In various aspects, the identifiers for each edge type for a given node are selected for membership in the AMQ filter for that node. The selected identifiers, which may be the strings or a coded value for each edge type, are fed to each of the hash functions, which return a position in the membership array. The bit at each of the returned positions is set to indicate membership (e.g., setting the bit to one/TRUE), and any overlapping/repeated positions results in the bit remaining set to one/TRUE. As will be appreciated, the meaning assigned to the values of the bits may be reversed in another aspect (e.g., initialization with zero/TRUE and indicating membership with one/FALSE, etc.) without departing from the spirit of the present disclosure; the AMQ filter is operable to track membership via a second state from a baseline first state according to various conventions.

In aspects in which the edge types are extracted in coordination with a "live" graph query, method 200 proceeds to OPERATION 230, where the performance of the graph query continues. As the graph query traverses additional nodes, OPERATION 220 will be repeated to build the AMQ filters for those nodes. Method 200 then proceeds to OPERATION 240, where the results of the graph query are transmitted to a user device 110 that requested the graph query.

Figure 3:
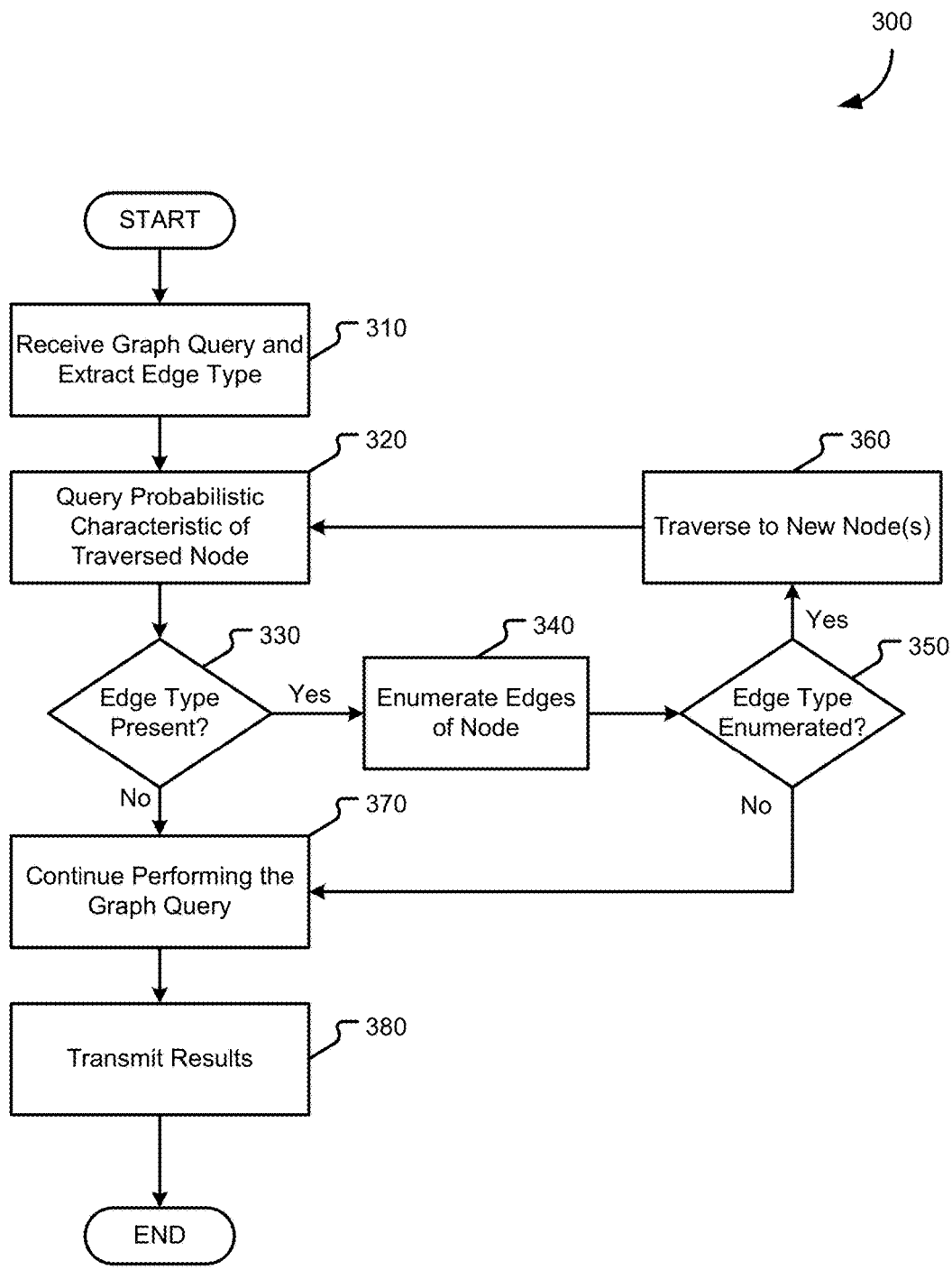
FIG. 3 is a flow chart showing general stages involved in an example method for reducing graph traversals when handling graph queries according to a probabilistic characteristic of the nodes traversed.

FIG. 3 is a flow chart showing general stages involved in an example method 300 for reducing graph traversals when handling graph queries according to a probabilistic characteristic of the nodes traversed. Although examples are given herein primarily in terms of edge types, it will be appreciated that other edge properties may also be used in concert with the present disclosure.

Method 300 begins at OPERATION 310, where a graph query is received and an edge type for the graph query is extracted. Depending on the graph query language used to form the graph query, edge types may be presented in a number of ways. As shown in CODE 1, an example graph query to span a relational graph to discover nodes for persons who "John Doe" is a manager of, e.g., nodes that include an edge type of "MANAGER_OF". In various aspects, the edge type is extracted based on a list of known edge types or a position in the graph query (based on a structure of the graph query language), and may include one or more edge types. One of ordinary skill in the art will be familiar with graph query languages, and will appreciate that CODE 1 is given as a non-limiting example and that other structures are possible with other edge type definitions.

CODE 1: MATCH (a:PERSON {name:"John Doe"})-[:MANAGER_OF]->(g:GROUP), RETURN g.title Method 300 proceeds to OPERATION 320, where the probabilistic characteristics of a traversed node are queried, and at DECISION 330 it is determined whether the edge type extracted in OPERATION 310 is present in the probabilistic characteristic of the traversed node. In some aspects, the probabilistic characteristics are represented as an AMQ filter, and the edge type extracted in OPERATION 310 is hashed as though it were to be added to the AMQ filter, and the positions generated therefore (i.e., candidate positions) are bitwise-logically examined against the array. If all of the positions generated for the hashed edge type have values in the array of one/TRUE, the AMQ filter returns a positive result (e.g., "probably in the set"), and method 300 will proceed to OPERATION 340. If one or more of the positions generated from the hashed query type have values in the array of zero/FALSE, the AMQ filter returns a negative result (e.g., "definitely not in the set"), and method 300 will proceed to OPERATION 370.

To illustrate OPERATION 320 and DECISION 330, consider the example member set of $Edge\_Type_A$, $Edge\_Type_B$, and $Edge\_Type_C$, which are recorded into an AMQ filter (e.g., via method 200) using three hash functions and an ordered array of thirty-two bits (positions). The identifier for each of the edge types is hashed according to each of the hash functions, yielding nine positions in the array (although not all nine positions may be unique). For example, $Edge\_Type_A$ may be mapped to positions 1, 7, and 26; $Edge\_Type_B$ to positions 5, 30, and 31; and $Edge\_Type_C$ to positions 5, 12, and 26; yielding nine positions (seven unique) in the array. The bits in the array at each of the positions (1, 5, 7, 12, 26, 30, and 31) are set to one/TRUE (the second state) and at all other positions the bits remain set to zero/FALSE (the first state). When a user checks whether $Edge\_Type_D$ is a member of the AMQ filter for the given node, $Edge\_Type_D$ is hashed according to each of the hash functions, yielding three candidate positions in the array—at positions 1, 5, and 23 in the present example. The values of the bits in the array at positions 1, 5, and 23 are one/TRUE, one/TRUE, and zero/FALSE respectively, and because at least one position's value is zero/FALSE (the first state), the AMQ filter will return a negative response indicating that $Edge\_Type_D$ is not part of the member set of edge types for the node. In another example, when a user checks whether $Edge\_Type_E$ is a member of the AMQ filter, $Edge\_Type_E$ is hashed according to each of the hash functions, yielding three candidate positions in the array—at positions 7, 12, and 30 in the present example. The values of the bits in the array at positions 7, 12, and 30 are all one/TRUE (the second state), and the AMQ filter will return a positive response (albeit a false positive) indicating that $Edge\_Type_E$ is potentially a member of the set.

At OPERATION 340, the edges (and their types) of the node are enumerated, and it is determined at DECISION 350 whether the edge type extracted in OPERATION 310 is among the enumerated edge types for each edge. The graph server 120 enumerates the edges (and their types) of the traversed node. When it is determined that the extracted edge type is among the enumerated edge types, method 300 proceeds to OPERATION 360. As the probabilistic characteristic may return false positives, but not false negatives, the extracted edge type may not be among the enumerated edge types for the given node, in which case method 300 proceeds to OPERATION 370.

At OPERATION 360 the graph server 120 traverses the edges of the desired type extracted in OPERATION 310 to new nodes that are related to the given node according to the desired edge type. These new nodes expand the view of the relational graph according to the graph query, and in turn may be expanded from to discover additional nodes to span according to the graph query. Method 300 proceeds to OPERATION 320 from OPERATION 360 so that as new nodes are traversed while performing the graph query, it is quickly determined, according to their probabilistic characteristics, whether they are dead-ends in the subgraph or whether additional nodes may be further discovered and traversed.

At OPERATION 370 the graph query continues to execute. For example, the graph query may traverse several nodes when spanning the relational graph, some of which may include the desired edge type, and some of which that do not. The nodes that do not include the desired edge type extracted in OPERATION 310 are treated as dead-ends in the span, and the graph server 120 does not examine their connected nodes, while nodes that include the desired edge type may continue to be examined. Once the graph query has traversed a sufficient number of nodes, reached a distance limit from a starting node, determined that no nodes exist in the current span that include the desired edge type, or otherwise completes, method 300 proceeds to OPERATION 380, where the results of the query are transmitted to the user device 110 from which the graph query was received.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
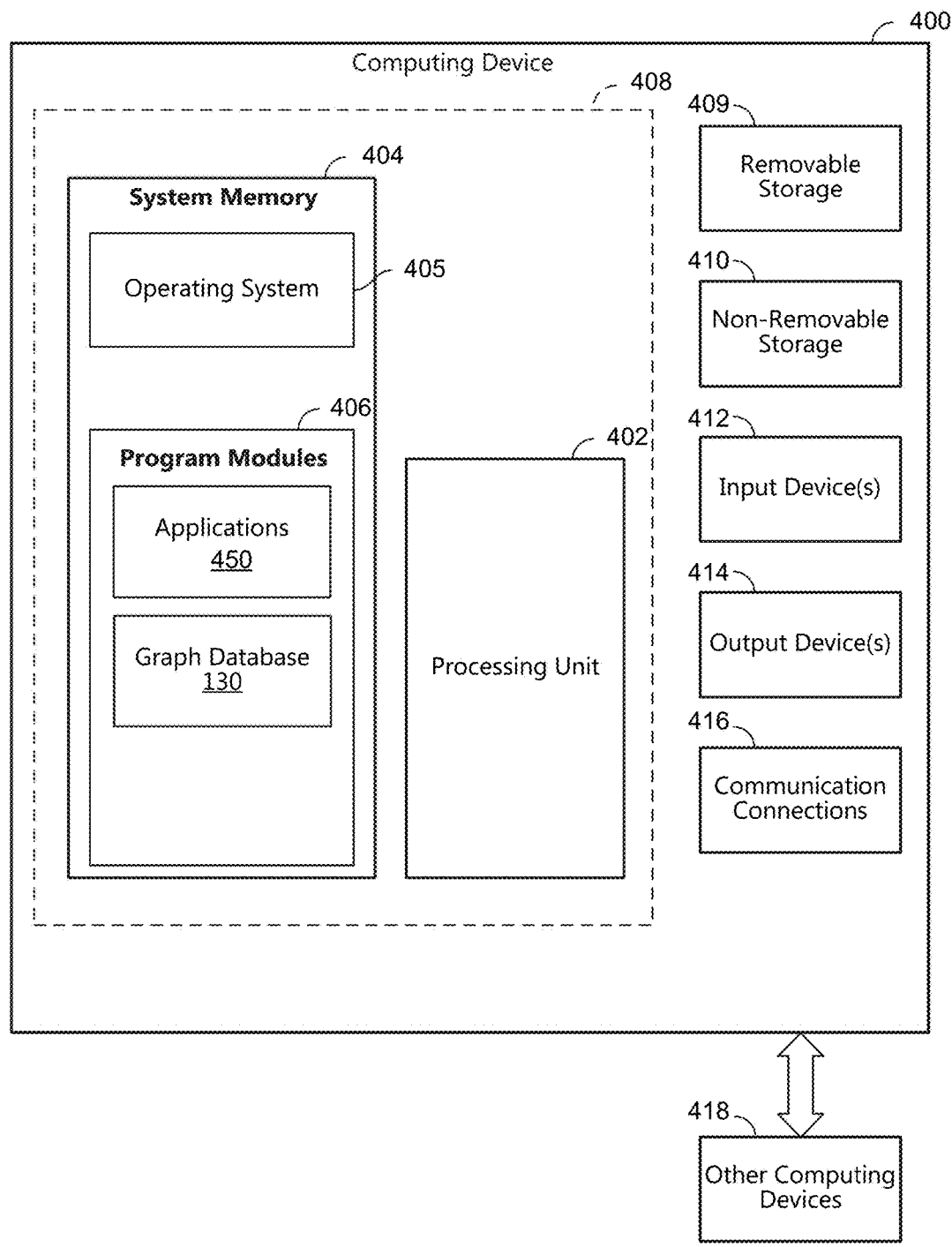
FIG. 4 is a block diagram illustrating example physical components of a computing device.
Figure 5A:
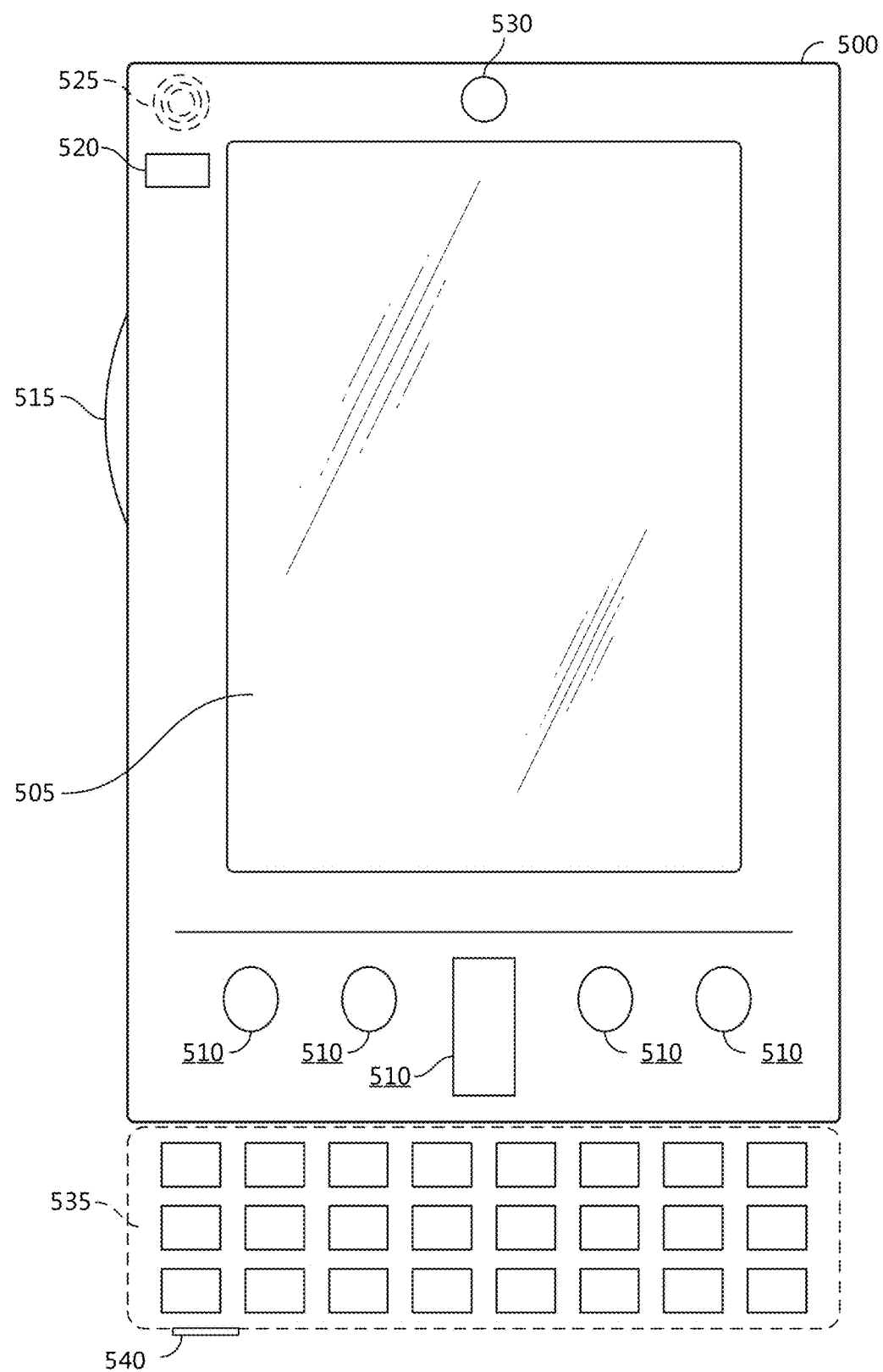
FIGS. 5A and 5B are block diagrams of a mobile computing device.
Figure 5B:
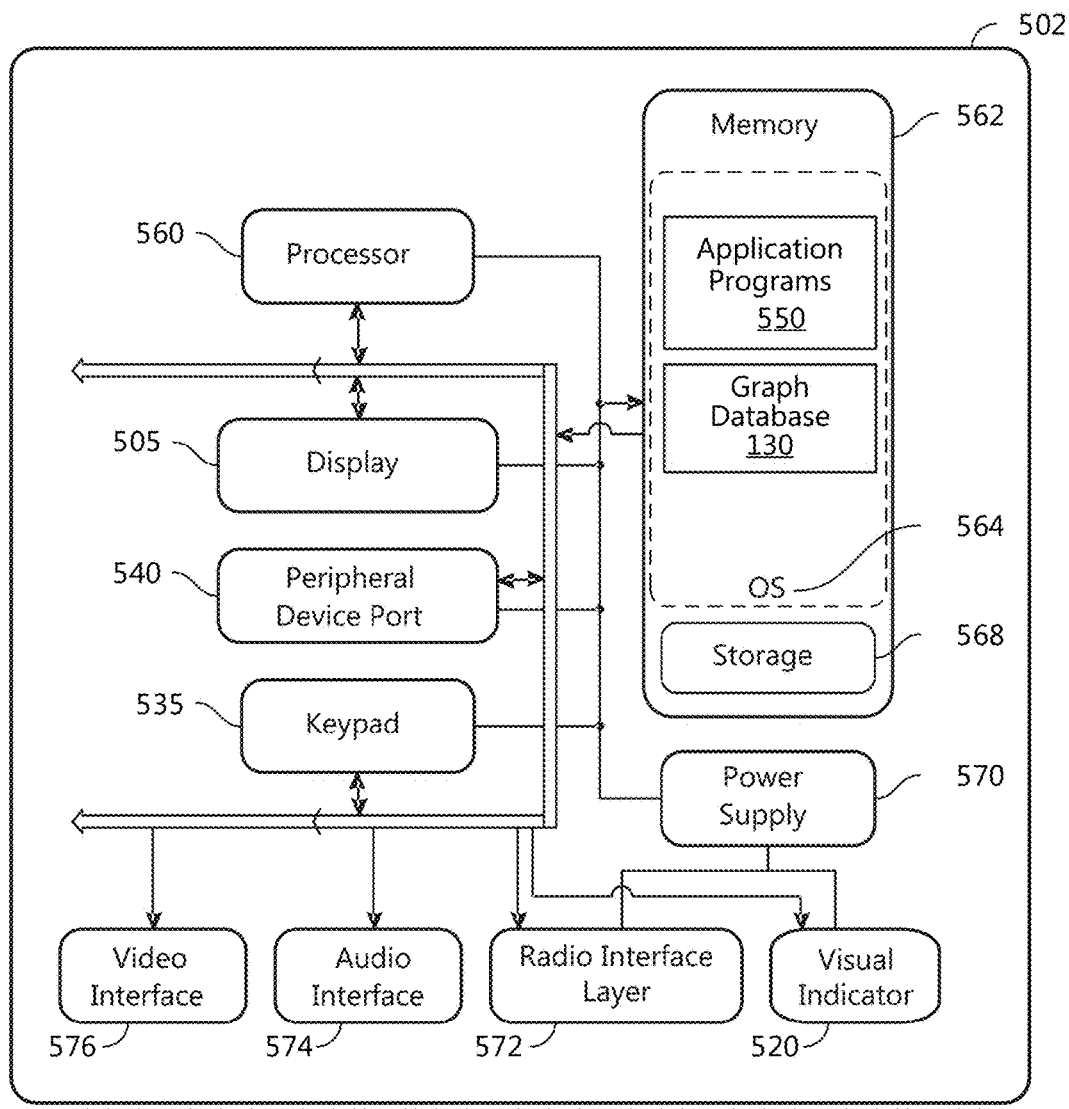
Figure 6:
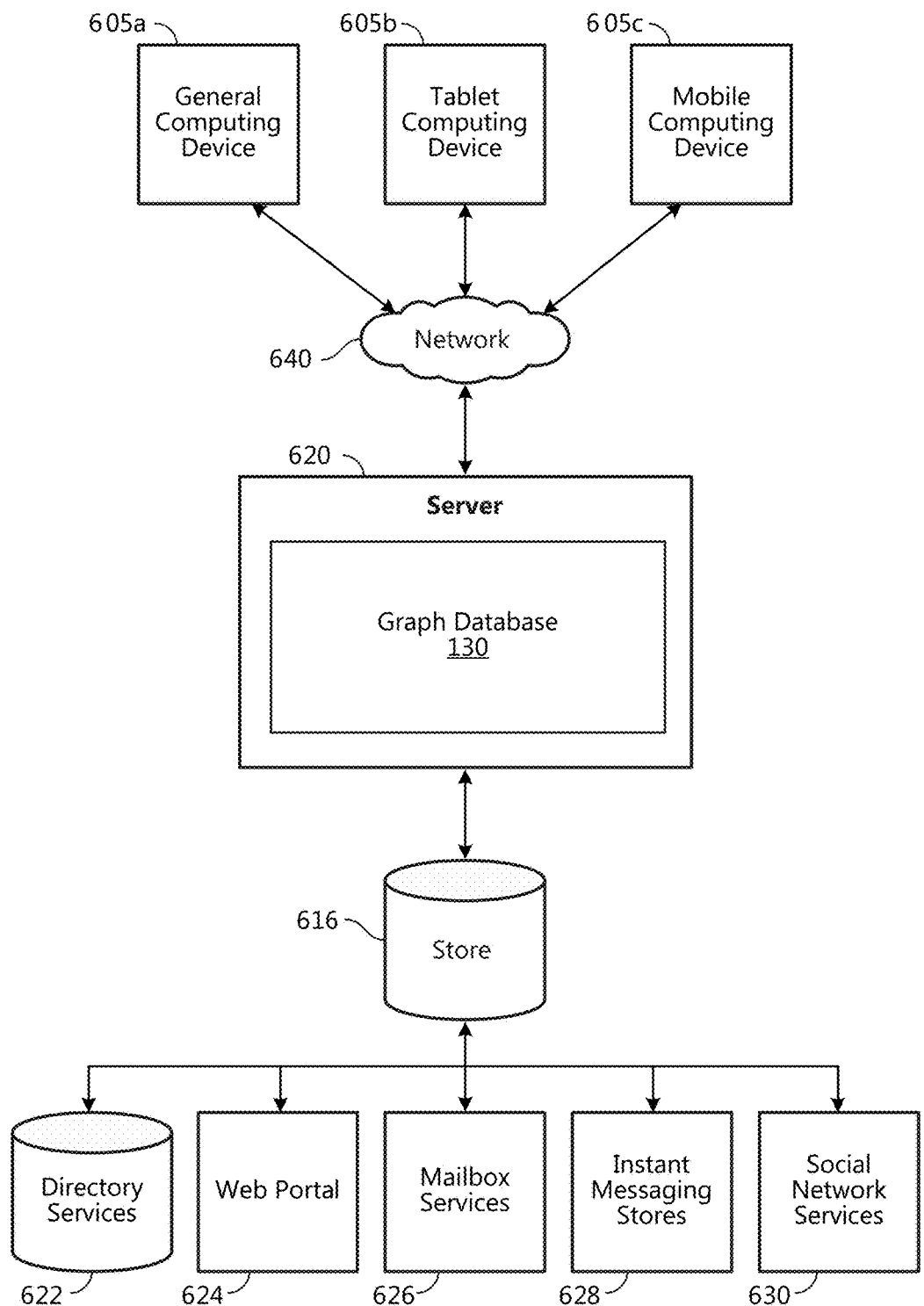
FIG. 6 is a block diagram of a distributed computing system.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes graph database 130. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., graph database 130) perform processes including, but not limited to, one or more of the stages of the methods illustrated in FIGS. 2-3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 4 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 400 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, graph database 130 is loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

FIG. 6 illustrates one example of the architecture of a system for utilization of probabilistic characteristics for reduction of graph database traversals as described above. Content developed, interacted with, or edited in association with the graph database 130 is enabled to be stored in different communication channels or other storage types. For example, various documents may be stored using a directory service 622, a web portal 624, a mailbox service 626, an instant messaging store 628, or a social networking site 630. The graph database 130 is operative to use any of these types of systems or the like for utilization of probabilistic characteristics for reduction of graph database traversals, as described herein. According to an aspect, a server 620 provides the graph database 130 to clients 605a,b,c. As one example, the server 620 is a web server providing the graph database 130 over the web. The server 620 provides the graph database 130 over the web to clients 605 through a network 640. By way of example, the client computing device is implemented and embodied in a personal computer 605a, a tablet computing device 605b or a mobile computing device 605c (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer readable storage device having a set of instructions, which when executed, performs a method for utilization of probabilistic characteristics for reduction of graph database traversals, the method comprising:
   receiving a graph query at a graph server hosting a graph database, the graph database comprising a plurality of nodes connected by one or more edges;
   identifying an initial node from the plurality of nodes associated with the graph query;
   extracting an edge type associated with the initial node from the graph query;
   querying a probabilistic characteristic of each node from the plurality of nodes that is connected to the initial node by an edge to determine whether the edge is associated with the extracted edge type;
   selecting a subset of the plurality of nodes, the selected subset including each node from the plurality of nodes for which the edge was determined to be associated with the extracted edge type;
   continuing performance of the graph query by examining the selected subset of the plurality of nodes; and
   transmitting results of the graph query.

2. The computer readable storage device of claim 1, wherein the probabilistic characteristic of each node identifies an edge type for the edge connected to the initial node.

3. The computer readable storage device of claim 1, wherein the probabilistic characteristic of each node is stored in-line with the node in the graph database.

4. A system for utilization of probabilistic characteristics for reduction of graph database traversals, comprising:
a processing unit; and
a memory including computer readable instructions, which when executed by the processing unit, causes the system to be operable to:
receive a graph query at a graph server hosting a graph database, the graph database comprising a plurality of nodes connected by one or more edges;
identify an initial node from the plurality of nodes associated with the graph query;
extract an edge type associated with the initial node from the graph query;
query a probabilistic characteristic of each node from the plurality of nodes that is connected to the initial node by an edge to determine whether the edge is associated with the extracted edge type;
select a subset of the plurality of nodes, the selected subset including each node from the plurality of nodes for which the edge was determined to be associated with the extracted edge type;
continue performance of the graph query by examining the selected subset of the plurality of nodes; and
transmit results of the graph query.

5. The system of claim 4, wherein the probabilistic characteristic of each node identifies an edge type for the edge connected to the initial node.

6. The system of claim 4, further comprising receiving a response to querying the probabilistic characteristic of each node.

7. The system of claim 6, further comprising enumerating each of one or more edges extending from a node when the edge connecting the node to the initial node is determined to be associated with the extracted edge type.

8. The system of claim 6, further comprising skipping a node when the edge connecting the node to the initial node is determined to not be associated with the extracted edge type.

9. The system of claim 4, wherein the probabilistic characteristic of each node is stored in-line with the node in the graph database.

10. The system of claim 4, wherein the probabilistic characteristic of each node is accessed as the graph database is traversed, thereby reducing computational resource expenditures.

11. The system of claim 4, wherein the probabilistic characteristic of each node is loaded into the memory in response to the node being accessed via a query search.

12. A method for utilization of probabilistic characteristics for reduction of graph database traversals, the method comprising:
receiving a graph query at a graph server hosting a graph database, the graph database comprising a plurality of nodes connected by one or more edges;
identifying an initial node from the plurality of nodes associated with the graph query;
extracting an edge type associated with the initial node from the graph query;
querying a probabilistic characteristic of each node from the plurality of nodes that is connected to the initial node by an edge to determine whether the edge is associated with the extracted edge type;
selecting a subset of the plurality of nodes, the selected subset including each node from the plurality of nodes for which the edge was determined to be associated with the extracted edge type;
continuing performance of the graph query by examining the subset of the plurality of nodes; and
transmitting results of the graph query.

13. The method of claim 12, wherein the probabilistic characteristic of each node identifies an edge type for the edge connected to the initial node.

14. The method of claim 12, further comprising receiving a response to querying the probabilistic characteristic of each node.

15. The method of claim 14, further comprising enumerating each of one or more edges extending from a node when the edge connecting the node to the initial node is determined to be associated with the extracted edge type.

16. The method of claim 14, further comprising skipping a node when the edge connecting the node to the initial node is determined to not be associated with the extracted edge type.

17. The method of claim 12, wherein the probabilistic characteristic for each node is stored in-line with the node in the graph database.

18. The method of claim 12, wherein the probabilistic characteristic for each node is accessed as the graph database is traversed, thereby reducing computational resource expenditures.

* * * * *